(12) United States Patent
Hsieh

(10) Patent No.: US 9,635,717 B2
(45) Date of Patent: Apr. 25, 2017

(54) LED LAMP

(71) Applicant: Wei-Che Hsieh, Taipei (TW)

(72) Inventor: Wei-Che Hsieh, Taipei (TW)

( * ) Notice: Subject to any disclaimer, the term of this patent is extended or adjusted under 35 U.S.C. 154(b) by 371 days.

(21) Appl. No.: 14/195,865

(22) Filed: Mar. 4, 2014

(65) Prior Publication Data

US 2014/0175983 A1    Jun. 26, 2014

(51) Int. Cl.
*H05B 33/08*       (2006.01)

(52) U.S. Cl.
CPC ..... *H05B 33/0809* (2013.01); *H05B 33/0827* (2013.01); *Y02B 20/341* (2013.01)

(58) Field of Classification Search
None
See application file for complete search history.

(56) References Cited

U.S. PATENT DOCUMENTS

| | | | |
|---|---|---|---|
| 2013/0141002 A1* | 6/2013 | Esaki et al. | 315/224 |
| 2014/0117853 A1* | 5/2014 | Miyamichi | 315/119 |

\* cited by examiner

*Primary Examiner* — Jany Richardson

(57) ABSTRACT

An LED lamp includes a rectifier, a microcontroller, at least one group of LEDs, and at least one MOSFET device. The group of LEDs includes multiple lines of serially connected LEDs, which are connected in parallel to form a first end connected to a DC output of the rectifier and a second end connected to one or more serially connected current-limiting resistors which in turn are connected to a common ground. The gate terminal of the MOSFET device is connected to an output pin of the microcontroller. The drain terminal of the MOSFET device is connected to the second end of the group of LEDs. The source terminal of the MOSFET device is connected to the common ground. A voltage detection circuit is connected between the DC output of the rectifier and an input pin of the microcontroller for detecting the voltage at the DC output of the rectifier.

6 Claims, 2 Drawing Sheets

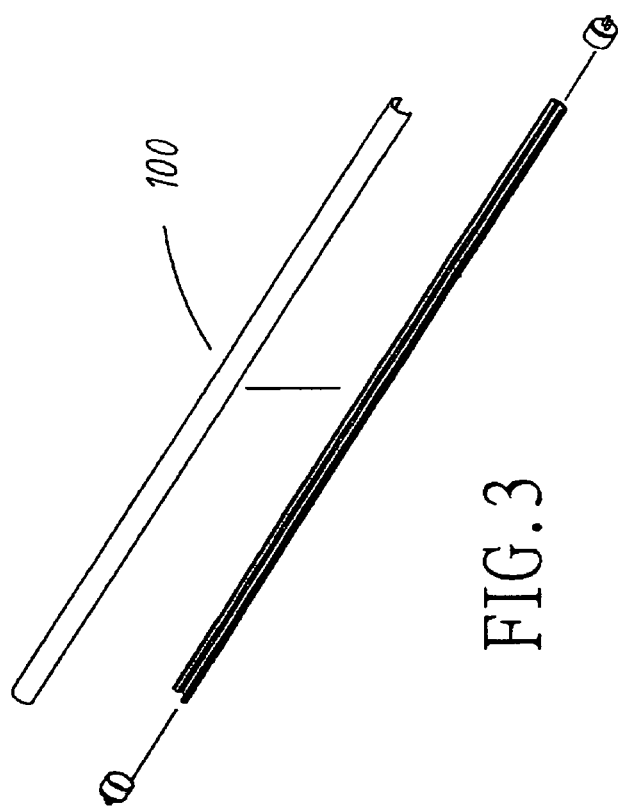
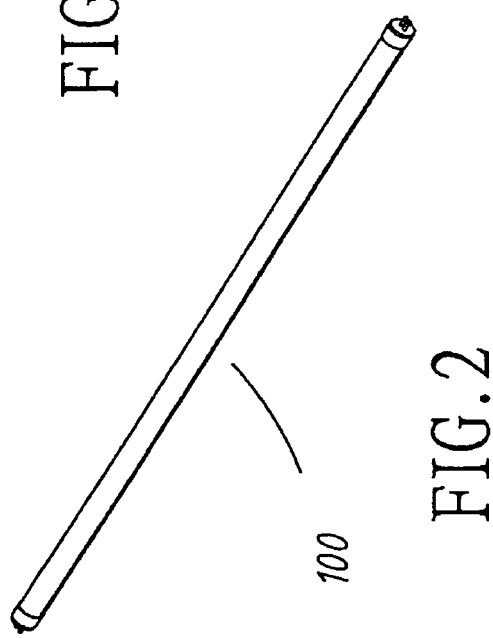

LED LAMP

BACKGROUND OF THE INVENTION

1. Field of the Invention

The invention relates to a lamp and more particularly to a light-emitting diode (LED) lamp that can be directly mounted to a fixture prepared for a fluorescent lamp.

2. Description of Related Art

LEDs are renowned for their long life and their ability to resist shock. Also, an LED consumes much less electrical power than fluorescent lamps. Therefore, LED lighting devices are gaining popularity worldwide. Recently, LEDs as a light source have been employed in outdoor lighting devices.

However, ballasts have various types, such as instant start ballasts, rapid start ballasts, programmed-start ballasts, hybrid ballasts, and so on. For a programmed-start ballast, it can output a high-frequency voltage for preheating the filaments of a fluorescent lamp and then can output a high voltage to initiate an arc; once starting the lamp, the ballast can output an operating voltage, which is less than the preheating voltage and the initiating voltage. Thus, for replacing an existing fluorescent lamp with an LED lamp, the features of the existing ballast associated with the fluorescent lamp should be investigated. Through constant investigation on the technology of fluorescent lamps, applicant has contrived an LED lamp that can replace an existing fluorescent lamp and cooperate well with the ballast used with the existing fluorescent lamp.

SUMMARY OF THE INVENTION

It is therefore one object of the invention to provide a lamp comprising a rectifier which receives AC power from a fixture and converts it to DC power, a microcontroller, at least one group of LEDs, and at least one MOSFET device; wherein a surge protection device (SPD) is electrically connected between a DC output of the rectifier and a power supply input pin of the microcontroller for protecting the microcontroller from voltage spikes; the group of LEDs includes multiple lines of serially connected LEDs, which are connected in parallel to form a first end connected to the DC output of the rectifier and a second end connected to one or more serially connected current-limiting resistors which in turn are connected to a common ground; the gate terminal of the MOSFET device is connected to an output pin of the microcontroller, the drain terminal of the MOSFET device is connected to the second end of the group of LEDs, and the source terminal of the MOSFET device is connected to the common ground, whereby the current-limiting resistors are connected in parallel with a channel that will be created between the drain terminal and the source terminal of the MOSFET device when the gate terminal of the MOSFET device is at a high voltage; and a voltage detection circuit is connected between the DC output of the rectifier and an input pin of the microcontroller for detecting the voltage at the DC output of the rectifier.

The above and other objects, features and advantages of the invention will become apparent from the following detailed description taken with the accompanying drawings.

BRIEF DESCRIPTION OF THE DRAWINGS

FIG. 2 is a perspective view of the LED lamp; and

FIG. 3 is an exploded view of the LED lamp shown in FIG. 2, wherein the groups of LEDs are not included.

DETAILED DESCRIPTION OF THE INVENTION

Figure 1:
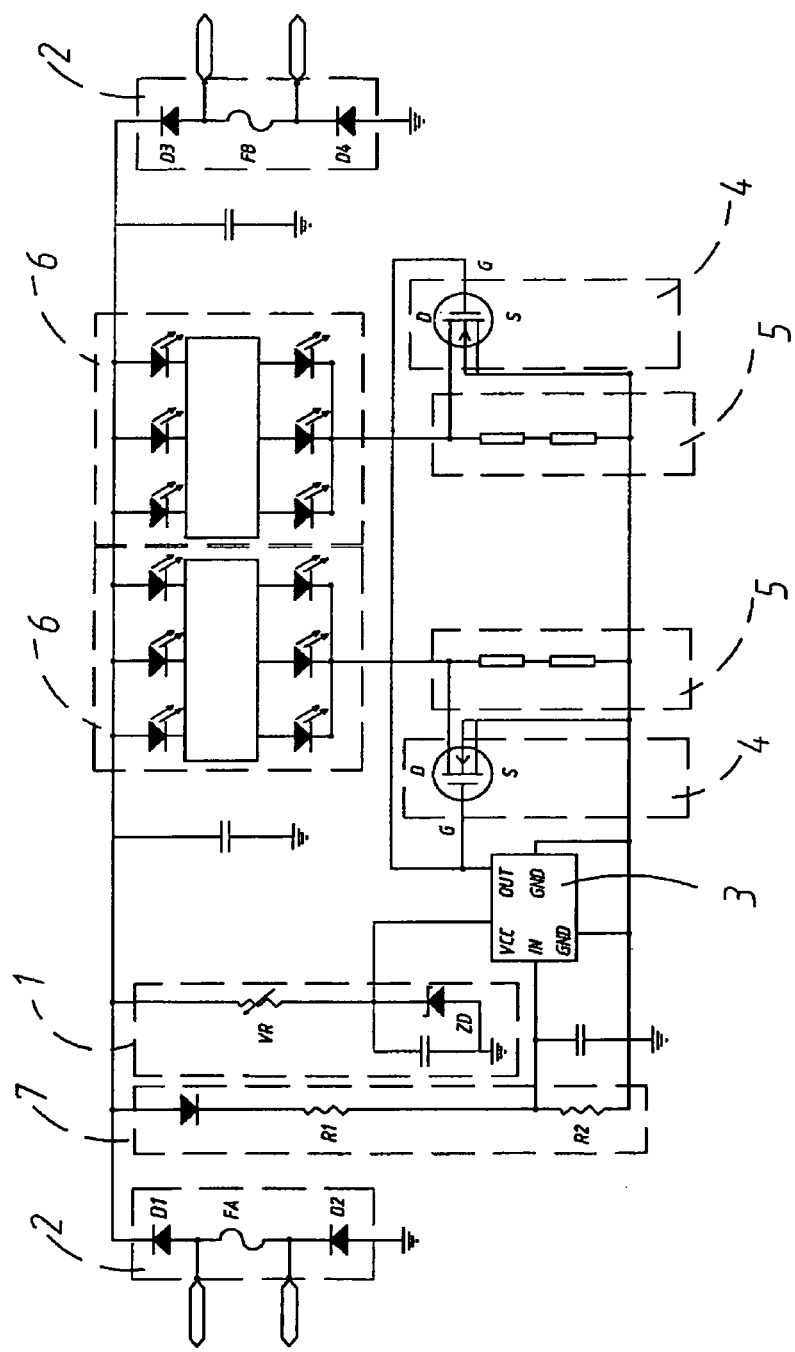
FIG. 1 is a circuit diagram of an LED lamp according to one embodiment of the present invention.

Referring to FIGS. 1 to 3, an LED lamp 100 in accordance with one embodiment of the invention is shown. The LED lamp 100 is shaped as a fluorescent lamp. That is, the invention is implemented according to a typical fluorescent lamp (e.g., T5, T8, T9, or PL lamp), so that the LED lamp 100 can be directly mounted to a fixture prepared for the fluorescent lamp and can replace the fluorescent lamp. The LED lamp 100 generally comprises a bridge rectifier 2 which receives AC power from the fixture and converts it to DC power, a microcontroller 3, two MOSFET devices 4, and two groups of LEDs 6.

The bridge rectifier 2 includes a first group of serially connected elements and a second group of serially connected elements, wherein the first group of serially connected elements consists of a first diode (D1), a first fuse (FA), and a second diode (D2); the second group of serially connected elements consists of a third diode (D3), a second fuse (FB), and a fourth diode (D4); the cathode end of the first diode (D1) and the cathode end of the third diode (D3) are connected to form a DC output of the rectifier 2 while the anode end of the second diode (D2) and the anode end of the fourth diode (D4) are connected to form a common ground; two ends of the first fuse (FA) and two ends of the second fuse (FB) are adapted for electrical connection to the fixture. The fuses (FA)(FB) can provide overcurrent or short protection for the LED lamp 100. Specifically, the first group of serial connected elements and the second group of serially connected elements are respectively arranged at two distal ends of the LED lamp 100, which can facilitate the circuit of the LED lamp to achieve an electrical balance. A surge protection device (SPD) 1 is electrically connected between the DC output of the rectifier 2 and a power supply input pin (VCC) of the microcontroller 3 for protecting the microcontroller 3 from voltage spikes. As shown, the surge protection device 1 can be a voltage divider formed by a variable resistor (VR) and a zener diode (ZD) connected in series with the variable resistor (VR), between the DC output of the rectifier 2 and the common ground, wherein the power supply pin (VCC) of the microcontroller 3 is connected to the junction of the variable resistor (VR) and the zener diode (ZD). In the embodiment, two groups of LEDs 6 are provided for the LED lamp 100, wherein the two groups of LEDs 6 are arranged along a longitudinal axis of the LED lamp 100 to be substantially symmetrical about a center thereof; each group of LEDs 6 includes multiple lines of serially connected LEDs, which are connected in parallel to form a first end connected to the DC output of the rectifier 2 and a second end connected to one or more serially connected current-limiting resistors 5 which in turn are connected to the common ground. The current-limiting resistors 5 have a resistance value sufficient to limit the current flowing through the corresponding group of LEDs 6 so as to protect the LEDs from damages.

Furthermore, the gate terminal (G) of each MOSFET device 4 is connected to an output pin (OUT) of the microcontroller 3 (in FIG. 1, the gate terminals of the two MOSFET devices are connected to the same output pin of the microcontroller), wherein the drain terminal (D) of each MOSFET device 4 is connected to the second end of the corresponding group of LEDs, and the source terminal (8) of each MOSFET device 4 is connected to the common ground, so that the corresponding current-limiting resistors 5 are connected in parallel to a channel of the MOSFET device 4 that will be created between the drain terminal (D) and the source terminal (S) when the gate terminal (G) is at a high voltage.

Furthermore, a voltage detection circuit 7 is connected between the DC output of the rectifier 2 and an input pin (IN) of the microcontroller 3 for detecting the voltage at the DC output of the rectifier 2, which is related to the output voltage generated by a ballast provided at the fixture for use with the fluorescent lamp. As shown, the voltage detection circuit 7 can be a voltage divider formed by a set of serially connected elements, including a diode (which is an optional element) and a first resistor (R1) and a second resistor (R2), between the DC output of the rectifier 2 and the common ground, wherein the input pin (IN) of the microcontroller 3 is connected to the junction of the first resistor (R1) and the second resister (R2).

In operation, according to the voltage detected at the DC output of the rectifier 2, which reflects the output voltage generated by the ballast provided at the fixture, the microcontroller 3 generates a PWM signal to the output pin (OUT) thereof, which is connected to the gates (G) of the MOSFET devices 4, so that the current flowing through each group of LEDs 6 is controlled by the PWM signal to flow through the channel created in the corresponding MOSFET device 4 and thus the brightness of the group of LEDs can be controlled accordingly. In the case of an excessively high voltage being detected at the DC output of the rectifier, the microcontroller 3 will generate a low voltage to the output pin (OUT) thereof, so that the MOSFET devices 4 will be turned off and thus the current flowing through each group of LEDs 6 is unable to flow through the corresponding MOSFET device 4 but able to flow through the corresponding current-limiting resistors 5 in series therewith, so that the current flowing through each group of LEDs will be limited and thus each group of LEDs can be protected from damages. Also, since the elements (D1, D2, D3, D4, FA, FB) of the bridge rectifier 2 and all groups of LEDs 6 together with the MOSFET devices 4 and the current-limiting resistors 5 are arranged along a longitudinal axis of the LED lamp 100 to be substantially symmetrical about the center of the LED lamp 100, the electrical balance of the circuit of the LED lamp 100 can be achieved more easily.

While the invention has been described in terms of preferred embodiments, those skilled in the art will recognize that the invention can be practiced with modifications within the spirit and scope of the appended claims.

What is claimed is:

1. An LED lamp for being mounted to a fixture prepared for a fluorescent lamp and a ballast used with the fluorescent lamp, the LED lamp replacing the fluorescent lamp, the LED lamp comprising a rectifier which receives AC power from the fixture and converts it to DC power, a microcontroller, at least one group of LEDs, and at least one MOSFET device, wherein:

a surge protection device is electrically connected between a DC output of the rectifier and a power supply input pin of the microcontroller;

the group of LEDs includes multiple lines of serially connected LEDs, which are connected in parallel to form a first end connected to the DC output of the rectifier and a second end connected to one or more serially connected current-limiting resistors which in turn are connected to a common ground;

the gate terminal of the MOSFET device is connected to an output pin of the microcontroller, the drain terminal of the MOSFET device is connected to the second end of the group of LEDs, and the source terminal of the MOSFET device is connected to the common ground, whereby the current-limiting resistors are connected in parallel with a channel that will be created between the drain terminal and the source terminal of the MOSFET device when the gate terminal of the MOSFET device is at a high voltage; and a voltage detection circuit is connected between the DC output of the rectifier and an input pin of the microcontroller for detecting the voltage at the DC output of the rectifier;

whereby, according to the voltage detected at the DC output of the rectifier, the microcontroller generates a PWM signal to the output pin thereof which is connected to the gate of the MOSFET device, so that the current flowing through the LEDs is controlled by the PWM signal to flow through the channel created in the MOSFET device and thus the brightness of the LEDs can be controlled accordingly; in the case of an excessively high voltage being detected at the DC output of the rectifier, the microcontroller will generate a low voltage to the output pin thereof, so that the MOSFET device will be turned off and thus the current flowing through the LEDs is unable to flow through the MOSFET device but able to flow through the current-limiting resistors in series therewith, so the current flowing through the LEDs will be limited and thus the LEDs can be protected from damages.

2. The LED lamp of claim 1, wherein the rectifier is a bridge rectifier, which includes a first group of serially connected elements consisting of a first diode, a first fuse and a second diode, and a second group of serially connected elements consisting of a third diode, a second fuse and a fourth diode, wherein the cathode end of the first diode and the cathode end of the third diode are connected to form the DC output of the rectifier while the anode end of the second diode and the anode of the fourth diode are connected to form the common ground; two ends of the first fuse and two ends of the second fuse are adapted for electrical connection to the fixture.

3. The LED lamp of claim 2, wherein the voltage detection circuit is a voltage divider formed by a first resistor and a second resistor connected in series with the first resistor, between the DC output of the rectifier and the common ground, wherein the input pin of the microcontroller is connected to the junction of the first resistor and the second resister.

4. The LED lamp of claim 2, wherein the surge protection device is a voltage divider formed by a variable resistor and a zener diode connected in series with the variable resistor, between the DC output of the rectifier and the common ground, wherein the power supply pin of the microcontroller is connected to the junction of the variable resistor and the zener diode.

5. The LED lamp of claim 2, which further comprises a second group of LEDs and a second MOSFET device, wherein the second group of LEDs includes multiple lines of serially connected LEDs, which are connected in parallel to form a first end connected to the DC output of the rectifier and a second end connected in series with a second set of serially connected current-limiting resistors which in turn are connected to the common ground; the gate terminal of the second MOSFET device is connected to the output pin of the microcontroller, the drain terminal of the second MOSFET device is connected to the second end of the second group of LEDs, and the source terminal of the second MOSFET device is connected to the common ground, so that the second set of serially connected current-limiting resistors is connected in parallel with a channel that will be created between the drain terminal and the source terminal of the second MOSFET device when the gate terminal of the second MOSFET device is at a high voltage.

6. An LED lamp for being mounted to a fixture prepared for a fluorescent lamp and a ballast used with the fluorescent lamp, the LED lamp replacing the fluorescent lamp, the LED lamp comprising a bridge rectifier which receives AC power from the fixture and converts it to DC power, a microcontroller, multiple groups of LEDs, and multiple MOSFET devices corresponding to the groups of LEDs, wherein:

the bridge rectifier includes a first group of serially connected elements consisting of a first diode, a first fuse and a second diode, and a second group of serially connected elements consisting of a third diode, a second fuse and a fourth diode, wherein the first group of serial connected elements and the second group of serially connected elements are respectively arranged at two distal ends of the LED lamp; the cathode end of the first diode and the cathode end of the third diode are connected to form a DC output of the rectifier while the anode end of the second diode and the anode of the fourth diode are connected to form a common ground; two ends of the first fuse and two ends of the second fuse are adapted for electrical connection to the fixture;

a surge protection device is electrically connected between the DC output of the bridge rectifier and a power supply input pin of the microcontroller;

each group of LEDs includes multiple lines of serially connected LEDs, which are connected in parallel to form a first end connected to the DC output of the bridge rectifier and a second end connected to one or more serially connected current-limiting resistors which in turn are connected to the common ground, all the groups of LEDs are arranged along a longitudinal axis of the LED lamp to be substantially symmetrical about a center thereof;

the gate terminal of each MOSFET device is connected to an output pin of the microcontroller, the drain terminal of each MOSFET device is connected to the second end of the corresponding group of LEDs, and the source terminal of each MOSFET device is connected to the common ground, so that each set of serially connected current-limiting resistors is connected in parallel to a channel that will be created between the drain terminal and the source terminal of the corresponding MOSFET device when the gate terminal of the corresponding MOSFET device is at a high voltage; and a voltage detection circuit is connected between the DC output of the bridge rectifier and an input pin of the microcontroller for detecting the voltage at the DC output of the bridge rectifier;

whereby, according to the voltage detected at the DC output of the bridge rectifier, the microcontroller generates a PWM signal to each of its output pins being connected to the gate terminals of the MOSFET devices, so that the current flowing through each group of LEDs is controlled by the PWM signal to flow through the channel created in the corresponding MOSFET device and thus the brightness of each group of the LEDs can be controlled accordingly; in the case of an excessively high voltage being detected at the DC output of the bridge rectifier, the microcontroller will generate a low voltage to its output pins, so that the MOSFET devices will be turned off and thus the current flowing through each group of LEDs is unable to flow through the corresponding MOSFET device but able to flow through the corresponding current-limiting resistors in series therewith, so the current flowing through each group of LEDs will be limited and thus each group of LEDs can be protected from damages; furthermore, due to the elements of the bridge rectifier and the groups of LEDs being arranged to be substantially symmetrical about the center of the LED lamp, electrical balance can be achieved more easily.

* * * * *